United States Patent
Masaoka et al.

(10) Patent No.: US 9,577,476 B2
(45) Date of Patent: Feb. 21, 2017

(54) WIRELESS POWER TRANSMISSION DEVICE AND CONTROL METHOD OF THE SAME

(75) Inventors: Shinya Masaoka, Hiroshima (JP);
Katsuhiko Mito, Hiroshima (JP);
Akira Hirano, Hiroshima (JP);
Norihiro Okubo, Hiroshima (JP);
Masaki Naito, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 383 days.

(21) Appl. No.: 14/368,887

(22) PCT Filed: Dec. 27, 2011

(86) PCT No.: PCT/JP2011/080239
§ 371 (c)(1),
(2), (4) Date: Jun. 26, 2014

(87) PCT Pub. No.: WO2013/098948
PCT Pub. Date: Jul. 4, 2013

(65) Prior Publication Data
US 2014/0354052 A1    Dec. 4, 2014

(51) Int. Cl.
*H01F 27/42* (2006.01)
*H02J 17/00* (2006.01)
(Continued)

(52) U.S. Cl.
CPC ............. *H02J 17/00* (2013.01); *H02J 5/005* (2013.01); *H02J 7/025* (2013.01); *H02J 50/00* (2016.02);
(Continued)

(58) Field of Classification Search
CPC ............. H02J 50/40; H02J 50/80; H02J 50/00
See application file for complete search history.

(56) References Cited

U.S. PATENT DOCUMENTS

2010/0225272 A1    9/2010  Kirby et al.
2011/0127843 A1*   6/2011  Karaoguz .......... G06K 7/10207
                                                307/104

FOREIGN PATENT DOCUMENTS

CN    102083186 A    6/2011
EP    2 328 223 A1   6/2011
(Continued)

OTHER PUBLICATIONS

Office Action in corresponding Chinese Patenet Application No. 201180076070.X issued on Dec. 2, 2015 (12 pages).
(Continued)

*Primary Examiner* — Daniel Cavallari
(74) *Attorney, Agent, or Firm* — Osha Liang LLP

(57) ABSTRACT

Performing power transfer to a plurality of power receiving devices, a power transmission device allocates one of a plurality of channels to perform wireless power transfer to a power receiving device in response to a power transmission request transmitted from the power receiving device designating one or more of the plurality of the channels having different frequencies. In a case where a power transmission request using the first channel is received from a second power receiving device, the device stops power transfer to the first power receiving device using the first channel, starts power transfer to the first power receiving device using a channel other than the first channel and starts power transfer to the second power receiving device using the first channel.

4 Claims, 7 Drawing Sheets

(51) Int. Cl.
*H02J 5/00* (2016.01)
*H02J 7/02* (2016.01)

(52) U.S. Cl.
CPC ............ *H02J 50/40* (2016.02); *H02J 50/80* (2016.02); *Y10T 307/406* (2015.04)

(56) References Cited

FOREIGN PATENT DOCUMENTS

| JP | 2009-268311 A | 11/2009 |
|----|---------------|---------|
| JP | 2009-278707 A | 11/2009 |
| JP | 2011-147271 A | 7/2011 |
| JP | 2011-193707 A | 9/2011 |

OTHER PUBLICATIONS

Office Action in corresponding Korean Patent Application No. 10-2014-7018221 dated Apr. 7, 2016, with translation (7 pages).
Extended European Search Report in counterpart European Application No. 11 878 392.7 issued Jul. 13, 2015 (6 pages).
Notification of Transmittal of Copies of Translation of the International Preliminary Report on Patentability in corresponding PCT Application No. PCT/JP2011/080239, mailed Jul. 10, 2014. (1 page).
International Preliminary Report on Patentability in corresponding PCT Application No. PCT/JP2011/080239, mailed Jul. 1, 2014. (1 page).
English translation of Written Opinion of the International Searching Authority issued in PCT/JP2011/080239 mailed on Mar. 27, 2012. (4 pages).
International Search Report for corresponding International Application No. PCT/JP2011/080239, mailed Mar. 27, 2012 (2 pages).

\* cited by examiner

CHANNEL ALLOCATION INFORMATION

| CHANNEL ID | ALLOCATION DEVICE |
|---|---|
| CH1 | FIRST POWER RECEIVING DEVICE |
| CH2 | — |
| CH3 | SECOND POWER RECEIVING DEVICE |
| CH4 | — |

POWER TRANSMISSION PRIORITY INFORMATION

WIRELESS POWER TRANSMISSION DEVICE AND CONTROL METHOD OF THE SAME

CROSS-REFERENCE TO RELATED APPLICATIONS

The present application is a national stage application of PCT/JP2011/080239 filed Dec. 27, 2011. The priority application is hereby incorporated by reference in its entirety.

TECHNICAL FIELD

The present invention generally relates to a wireless power transmission device and a control method of the wireless power transmission device, and more particularly to a technique to certainly perform wireless power transfer to a plurality of power receiving devices.

BACKGROUND ART

Patent Literature 1 discloses a power transmission device including a power transmitter that generates a plurality of transmission signals at different frequencies, a power transmitting element that is fed with the transmission signals including power generated by the power transmitter, and a plurality of resonant elements having different resonant frequencies and provided where they can be coupled with the power transmitting element by electromagnetic induction.

CITATION LIST

Patent Literature

[PTL 1]
Japanese Patent Application Laid-open Publication No. 2011-147271

Recently, the needs for wireless power transmission are expanding with the growth of portable electronic devices, electric vehicles and the like, and practical use of power transmission over long distances based on electromagnetic resonance technology and the like is underway. In the practical use of the wireless power transfer over such long distances, it is anticipated that power supply is simultaneously performed to a plurality of power receiving devices by one power transmission device. In that case, it is required that the wireless power transfer is certainly performed to each of the power receiving devices according to specifications and power transfer capability of the power transmission device, or specifications of the power receiving device.

SUMMARY OF THE INVENTION

One or more embodiments of the present invention provide a wireless power transmission device and a control method of the wireless power transmission device that can certainly perform wireless power transfer to a plurality of power receiving devices.

In one aspect, one or more embodiments of the present invention may be a wireless power transmission device, the device allocating one of a plurality of channels to perform wireless power transfer to a power receiving device in response to a power transmission request that is transmitted from the power receiving device and that designates one or more of the plurality of the channels having different frequencies, wherein while performing power transfer to a first power receiving device in response to a first power transmission request that designates a plurality of the channels and that is transmitted from the first power receiving device, with allocating a first channel that is one of the designated channels, in a case where a second power transmission request that designates the first channel is received from a second power receiving device, the device stops power transfer to the first power receiving device using the first channel, starts power transfer to the first power receiving device using a channel other than the first channel in the plurality of the channels designated by the first power receiving device; and starts power transfer to the second power receiving device using the first channel.

According to one or more embodiments of the present invention, for example, in a case where the number of channels applicable to the first power receiving device is more than that applicable to the second power receiving device, the other channel (second channel) may be allocated to the first power receiving device, and it is possible to reallocate, to the second power receiving device, the channel (first channel) (available to the second power receiving device) that has been allocated to the first power receiving device. Thus, the wireless power transfer can be certainly performed to a plurality of power receiving devices.

In another aspect, one or more embodiments of the present invention may be wireless power transmission device, wherein each of the power receiving devices is set with a power transmission priority that is information to determine a priority in receiving the wireless power transfer from the power transmission device, the power transmission device receives, from the power receiving device together with the power transmission request, the power transmission priority set to the power receiving device, in a case where the power transmission request is received from another power receiving device during power transmission to one or more of the power receiving devices, determines whether or not there is a currently unallocated channel, in a case where there is no unallocated channel, compares the power transmission priority received from the other power receiving device with the power transmission priorities of the power receiving devices in the power transmission state, in a case where there is a power transmission priority that is lower than that of the other power receiving device in the power transmission priorities of the power receiving devices in the power transmission state, stops power transfer to the power receiving device having the lower power transmission priority, and starts power transfer to the other power receiving device using the channel that has been allocated to the power receiving device having the lower priority.

According to one or more embodiments of the present invention, when the power transmission request is received, the power transmission device performs power transfer in accordance with the power transmission priority given to each of the power receiving devices in a case where there is no unallocated channel. Thus, it is possible to appropriately perform the wireless power transfer to the plurality of power receiving devices.

It should be noted that the power transmission priority given to the power receiving device is set, for example, in accordance with whether or not the power receiving device includes an accumulator battery.

The power transmission priority given to the power receiving device is set, for example, depending on the remaining capacity of the accumulator battery in the power receiving device.

According to one or more embodiments of the present invention, it is possible to appropriately perform the wireless power transfer by effectively allocating the channels provided in the power transmission device in accordance with the power transmission priority given to each of the power receiving device.

Other features of the invention will become clear with reference to modes to carry out one or more of the embodiments of the invention and the drawings.

According to one or more embodiments of the present invention, wireless power transfer can be certainly performed to a plurality of power receiving devices. Furthermore, one of ordinary skill in the art would appreciate that certain "sections" or "devices" of one or more embodiments of the present invention can include or be implemented by a processor or circuit.

DESCRIPTION OF EMBODIMENTS

Below, modes to carry out the invention are described with reference to the drawings.

Figure 1:
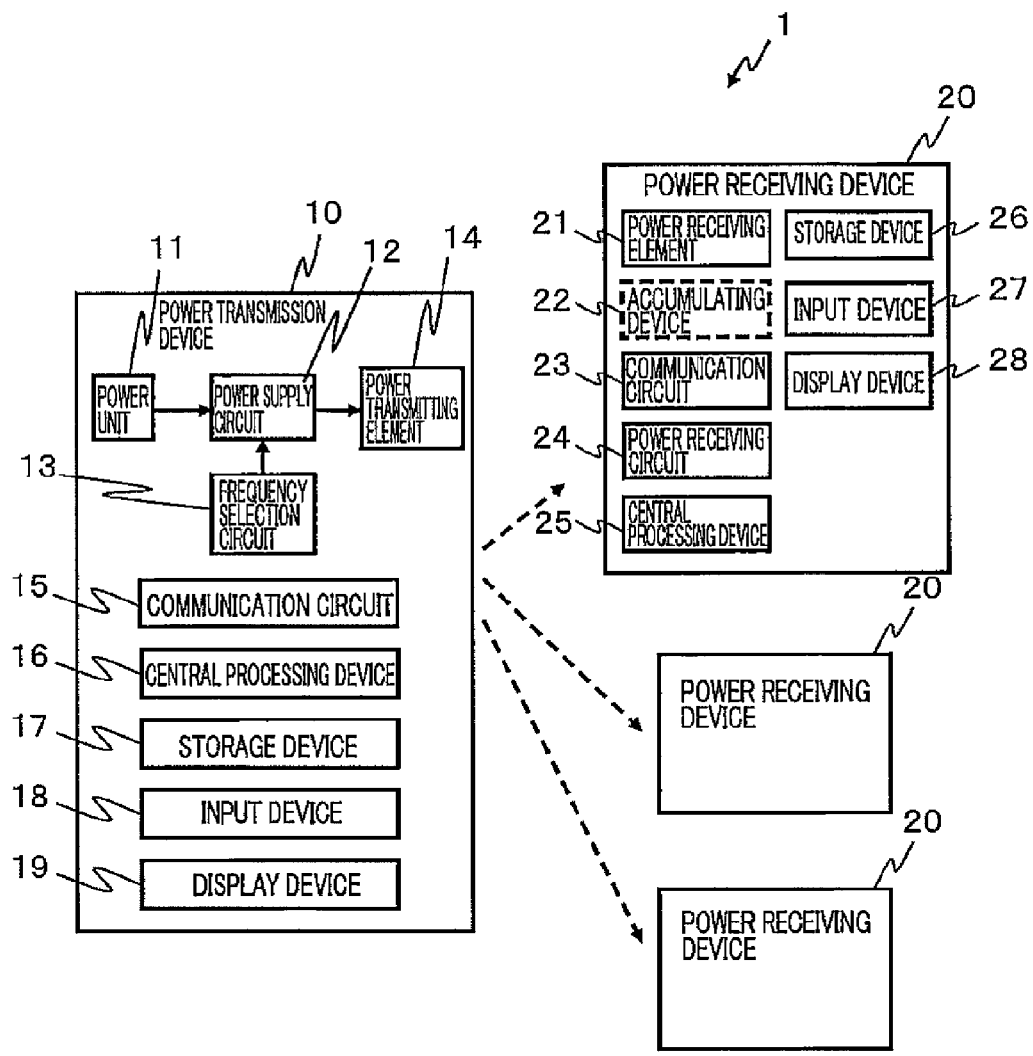
FIG. 1 describes a configuration of a wireless power transfer system 1 according to one or more embodiments of the invention.

FIG. 1 shows a configuration of a wireless power transfer system 1 that will be explained as an example of a first embodiment. As shown in the drawing, the wireless power transfer system 1 includes a power transmission device 10 (wireless power transmission device) and a plurality of power receiving devices 20 that receives power supply from the power transmission device 10 by wireless power transfer (wireless power supply). The power receiving device 20 is, for example, a mobile phone, a mobile data terminal, a compact household electrical appliance, an electric vehicle and the like. The power transmission device 10 is provided, for example, in an environment where the plurality of power receiving devices 20 exist, in an environment where a plurality of users having the power receiving device 20 go in and out, or in an environment accessible by unspecified users.

As shown in the drawing, the power transmission device 10 includes a power unit 11, a power supply circuit 12, a frequency selection circuit 13, a power transmitting element 14, a communication circuit 15, a central processing device 16, a storage device 17, an input device 18 and a display device 19.

The power unit 11 is, for example, a switching power source or a linear power source, and supplies power to drive elements of the power transmission device 10.

The power supply circuit 12 includes a driver circuit (such as a gate driver, a half-bridge driver) to generate a drive current of a prescribed frequency which is supplied to the power transmitting element 14 based on power supplied from the power unit 11.

The frequency selection circuit 12 selects a switching frequency of drive power supplied to the power transmitting element 14. The frequency selection circuit 12 is, for example, configured with an analog, a PLL (Phase Locked Loop), or a DDS (Direct Digital Synthesizer) frequency synthesizer. A frequency (hereinafter, also referred to as a channel) of a signal (such as a magnetic field, an electric field, an electromagnetic wave) (hereinafter, also referred to as a power transmission signal) to supply power from the power transmission device 10 to the power receiving device 20 by wireless power transfer can be switched by selecting the switching frequency of drive power that is supplied to the power transmitting element 14.

The power transmitting element 14 is an inductive element such as a coil in a case where the above-mentioned wireless power transfer is performed by a magnetic field method (a magnetic field coupling method, a magnetic resonance method), a capacitive element such as a capacitor in a case where the above-mentioned wireless power transfer is performed by an electric field method (an electric field coupling method, an electric field resonance method), and an antenna in a case where the above-mentioned wireless power transfer is performed by an electromagnetic wave method.

The communication circuit 15 communicates with the power receiving device 20 (for example, by wireless LAN (LAN: Local Area Network), wireless communication using IEEE 802.15.1 standard, wireless communication using IEEE 802.15.4 standard). It should be noted that, communication between the power transmission device 10 and the power receiving device 20 may be performed by modulating a power transmission signal, that is, by allowing the power transmission signal to include information to be transmitted.

The central processing device 16 is configured with a CPU or a MPU. The central processing device 16 performs an overall control of the power transmission device 10. The storage device 17 is configured with such as RAM, ROM, NVRAM and stores program and data. The input device 18 is a touch panel, ten keys, and the like. The display device 19 is a liquid crystal display and the like.

The power receiving device 20 includes a power receiving element 21, an accumulating device 22, a communication circuit 23, a power receiving circuit 24, a central processing device 25, a storage device 26, an input device 27, and a display device 28.

In these, the power receiving element 21 receives a power transmission signal transmitted from the power transmission device 10. It should be noted that, the power receiving element 21 is, for example, an inductive element such as a coil in a case where the wireless power transfer is performed by a magnetic field method (a magnetic field coupling method, a magnetic resonance method), a capacitive element such as a capacitor in a case where the wireless power transfer is performed by an electric field method (an electric field coupling method, an electric field resonance method), and an antenna in a case where the above-mentioned wireless power transfer is performed by an electromagnetic wave method.

The accumulating device 22 includes an accumulator battery such as a secondary battery (such as a lithium-ion battery, a lithium polymer battery, a nickel metal hydride battery, a nickel-cadmium battery) and a capacitative element (such as an electrical double-layer capacitor), a rectifying circuit that supplies to the accumulator battery a current based on an electromotive force generated with the power receiving element 21, a smoothing circuit, and a transmission circuit such as a DC/AC converter and a DC/DC converter. Note that, the power receiving device 20 does not necessarily have to have the accumulating device 22. For example, the power receiving device 20 may be configured to directly supply a current based on the electromotive force generated with the power receiving element 21 to a load (for example, in a case where the power receiving device 20 is a mobile phone, a circuit (a receiving circuit, a transmitting circuit and the like) of the mobile phone) of the power receiving device 20.

The communication circuit 23 communicates with the power transmission device 10 (for example, by wireless LAN, wireless communication using IEEE 802.15.1 standard, wireless communication using IEEE 802.15.4 standard).

The power receiving circuit 24 includes such as a tuning circuit that tunes a resonance frequency of the circuit including the power receiving element 21 to a frequency (channel) of power transmitted from the power transmission device 10, and a rectifying circuit that converts alternating current based on an electromotive force generated with the power receiving element 21 into direct current.

The central processing device 25 is configured with such as a CPU or a MPU. The central processing device 25 performs a centralized control of the power receiving device 20. The storage device 26 is configured with such as RAM, ROM, NVRAM and stores program and data. The input device 27 is such as a keyboard and a touch panel. The display device 28 is such as a liquid crystal panel.

Figure 2:
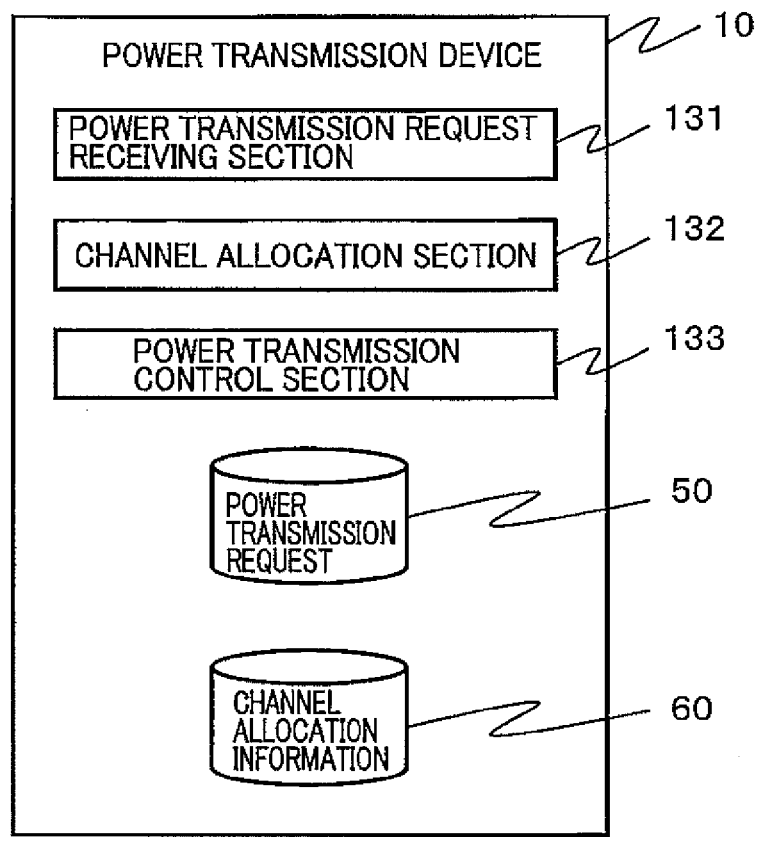
FIG. 2 describes main functions of a power transmission device 10 and information that the power transmission device 10 manages according to one or more embodiments of the invention.

FIG. 2 shows main functions of the power transmission device 10, and main information managed by the power transmission device 10. As shown in the drawing, the power transmission device 10 includes a power transmission request receiving section 131, a channel allocation section 132, and a power transmission control section 133. These functions are realized by hardware of the power transmission device 10, or the central processing device 16 of the power transmission device 10 reading and executing programs stored in the storage device 17.

Figure 3:
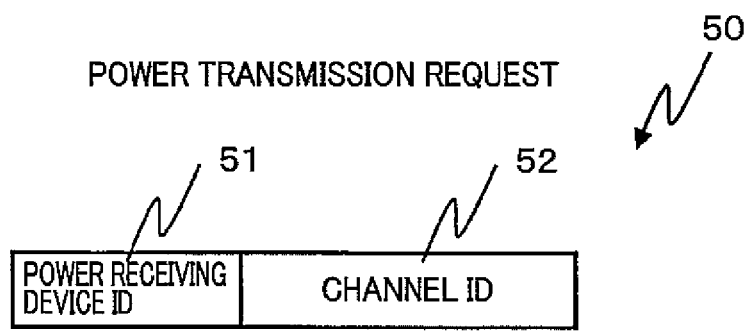
FIG. 3 describes a data configuration of a power transmission request 50 according to one or more embodiments of the invention.

The power transmission request receiving section 131 receives a power transmission request 50 transmitted from the power receiving device 20. FIG. 3 shows a data configuration of the power transmission request 50. As shown in the drawing, the power transmission request 50 includes respective information of a power receiving device ID 51 and a channel ID 52.

In these, the power receiving device ID 51 is set with identifiers (hereinafter, referred to as a power receiving device ID) uniquely given to each of the power receiving devices 20. The channel ID 52 is set with information (hereinafter, referred to as a channel ID) for designating a channel of the power transmission request. The channel ID 52 can be set with one or more channel IDs applicable to the power receiving device ID 51.

The channel allocation section 132 allocates, to the power receiving device 20, one of the channels that are designated by the power transmission request transmitted from the power receiving device 20. The channel allocation section 132 manages which channel is allocated to each power receiving device 20, as channel allocation information 60 to be described later.

The power transmission control section 133 controls the frequency selection circuit 13 according to the channel allocation information 60, and select a frequency used to supply power to each power receiving device 20.

As shown in FIG. 2, the power transmission device 10 manages the power transmission requests 50 received from each of the power receiving devices 20. Further, the power transmission device 10 manages channel allocation information 60 described above.

Figures 4, 5:
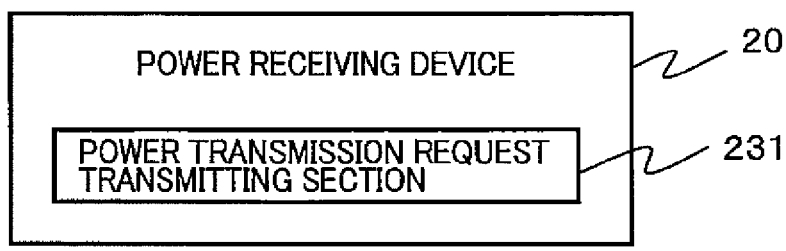
FIG. 4 is an example of channel allocation information 60 according to one or more embodiments of the invention.
FIG. 5 describes main functions of a power receiving device 20 according to one or more embodiments of the invention.

FIG. 4 shows an example of the channel allocation information 60. As shown in the drawing, the channel allocation information 60 is configured with one or more records including each item of a channel ID 61 and an allocation device 62.

In these, the channel ID 61 is set with the channel ID described above. The allocation device 62 is set with a power receiving device ID of the power receiving device 20 that is currently allocated to that channel. It should be noted that the allocation device 62 is set with "-", in a case where any of the power receiving devices 20 is not currently allocated to that channel.

FIG. 5 shows main functions of the power receiving device 20. As shown in the drawing, the power receiving device 20 includes a power transmission request transmitting section 231. The power transmission request transmitting section 231 transmits the power transmission request 50 described above to the power transmission device 10. It should be noted that the power transmission request transmitting section 231 is realized by hardware of the power receiving device 20, or the central processing device 25 of the power receiving device 20 reading and executing programs stored in the storage device 26.

<Description of Process>

Figure 6:
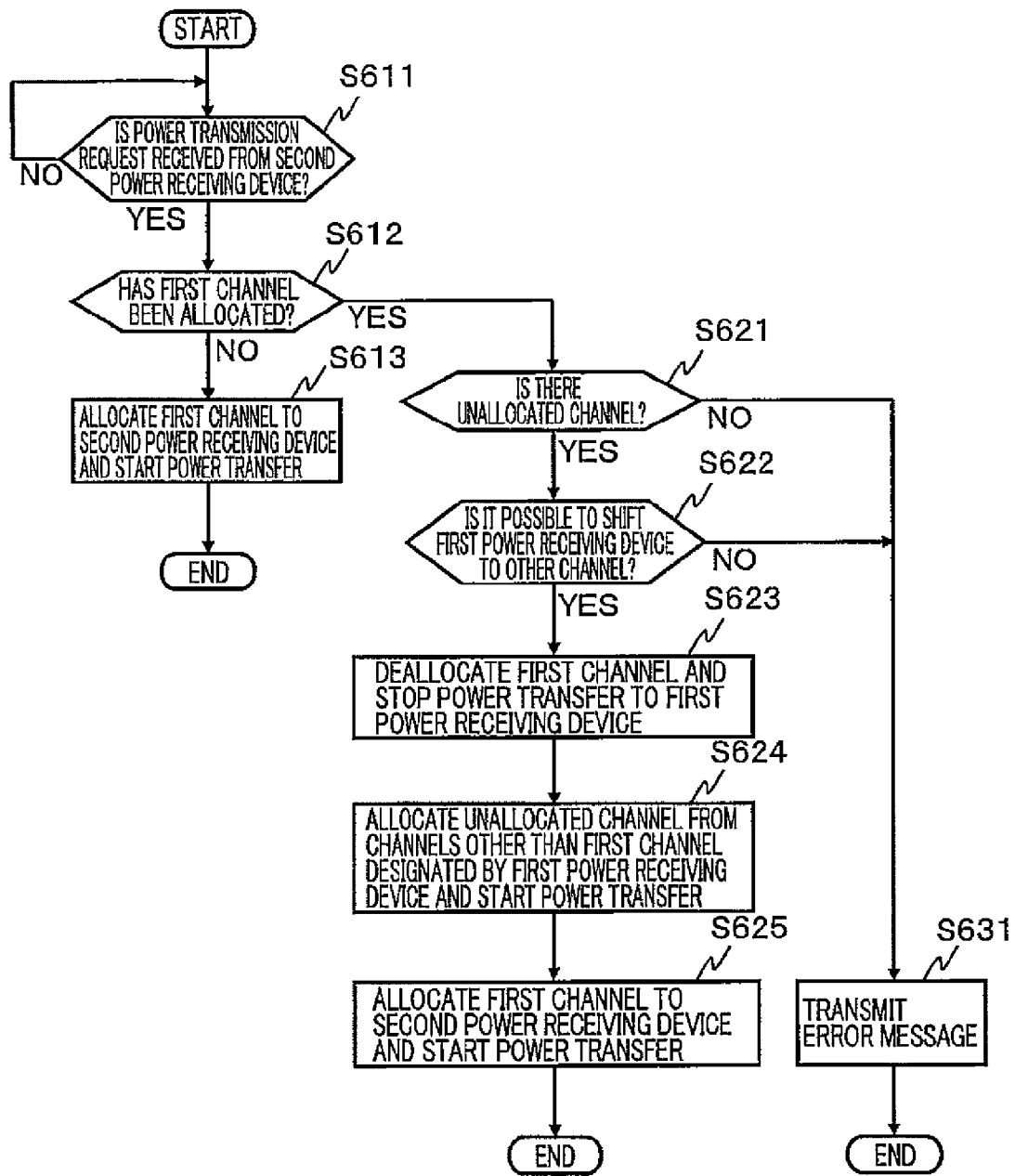
FIG. 6 is a flowchart describing a power transmission process S600 according to one or more embodiments of the invention.

Next, a process performed in the wireless power transfer system 1 having the above configuration will be explained. FIG. 6 is a flowchart describing a process (hereinafter, referred to as a power transmission process S600) performed by the power transmission device 10 when wireless power transfer is performed. Below, the power transmission process S600 is described with reference to the figure.

As shown in the drawing, the power transmission device 10 is on standby to receive the power transmission request 50 transmitted from the power receiving device 20 in real time (S611: NO).

When receiving the power transmission request 50 from the power receiving device 20 (hereinafter, referred to as a second power receiving device) (S611: YES), the power transmission device 10 refers to channel allocation information 60 to determine whether or not the channel (hereinafter, referred to as a first channel) that is set as the channel ID 52 of the received power transmission request (hereinafter, referred to as a second power transmission request) is currently allocated to another power receiving device 20 (S612). In a case where the first channel is currently free (S612: NO), the power transmission device 10 allocates the first channel to the second power receiving device 20 and starts power transfer to the second power receiving device 20 using the first channel (S613).

On the other hand, in a case where the first channel is currently allocated to another power receiving device 20 (hereinafter, referred to as a first power receiving device 20) (S612: YES), the power transmission device 10 refers to channel allocation information 60 to determine whether or not there is a currently unallocated channel (S621). In a case where there is no unallocated channel (S621: NO), the power transmission device 10 transmits to the power receiving device 20 an error message indicating that the channel cannot be allocated (S631).

On the other hand, in a case where there is an unallocated channel (S621: YES), the power transmission device 10 determines whether or not the channel allocation to the first power receiving device 20 can be changed (can be shifted to another channel) based on the power transmission request 50 of the first power receiving device 20 and the channel allocation information 60 (S622).

Specifically, the power transmission device 10 determines that the channel can be shifted in a case where a currently unallocated channel exists in the channels (channels other than the first channel) designated by the power transmission request 50 of the first power receiving device 20, and the channel cannot be shifted in a case where the currently unallocated channel does not exist therein. In a case where the power transmission device 10 determines that the first power receiving device 20 cannot be shifted to the other channel (S622: NO), the power transmission device 10 transmits to the power receiving device 20 an error message indicating that the channel cannot be allocated (S631).

On the other hand, in a case where the first power receiving device 20 can be shifted to the other channel (S622: YES), the power transmission device 10 deallocates the first channel to the first power receiving device 20, stops power transfer to the first power receiving device 20 (S623), and allocates to the first power receiving device 20 a currently unallocated channel from the channels other than the first channel designated by the power transmission request 50 of the first power receiving device 20 to start power transfer (S624). In this allocation, the power transmission device 10 communicates with the first power receiving device 20 to notify the first power receiving device 20 of a newly allocated channel. The first power receiving device 20 set the channel of the power receiving circuit 24 to the newly allocated channel that is notified from the power transmission device 10. It should be noted that in a case where a plurality of currently unallocated channels exist, the power transmission device 10 allocates, for example, an unallocated channel having the lowest channel number to the first power receiving device 20.

Then, the power transmission device 10 allocates the first channel to the second power receiving device 20 to start power transfer thereto (S625). It should be noted that the power transfer to the second power receiving device 20 may be immediately started after stopping the power transfer to the first power receiving device 20 (S623) without waiting for execution completion of the process of S624. In the allocation of this first channel, the power transmission device 10 communicates with the second power receiving device 20 to notify the second power receiving device 20 that the first channel has been allocated. The second power receiving device 20 receives this notification to set the channel of the power receiving circuit 24 to the first channel.

Although not shown in the figure, it should be noted that the power transmission device 10 monitors the presence/absence of reception of a power transfer stop request from the power receiving device 20 in real time, and when receiving the power transfer stop request, the power transfer to that power receiving device 20 is immediately stopped.

As explained above, according to the wireless power transfer system 1 of the present embodiment, when receiving the power transmission request from the power receiving device 20, the power transmission device 10 allocates an unallocated channel thereto and starts power transfer if an unallocated channel exists. Thus, the wireless power transfer can be certainly performed to a plurality of power receiving devices 20.

Further, for example, in a case where the power transmission request is received from the second power receiving device 20, and the number of channels applicable to the first power receiving device 20 to which the power transfer has already started is more than that applicable to the second power receiving device 20, it is possible to allocate the other channel (second channel) to the first power receiving device 20 and to reallocate the channel (first channel) (available to the second power receiving device 20) that has been allocated to the first power receiving device 20, to the second power receiving device 20. Thus, the wireless power transfer can be appropriately performed to a plurality of power receiving devices 20.

Next, a wireless power transfer system 1 of an example of a second embodiment will be explained. It should be noted that a hardware configuration of the power transmission device 10 and a hardware configuration of the power receiving device 20 in the second example embodiment are similar to those in the first example embodiment.

Figure 7:
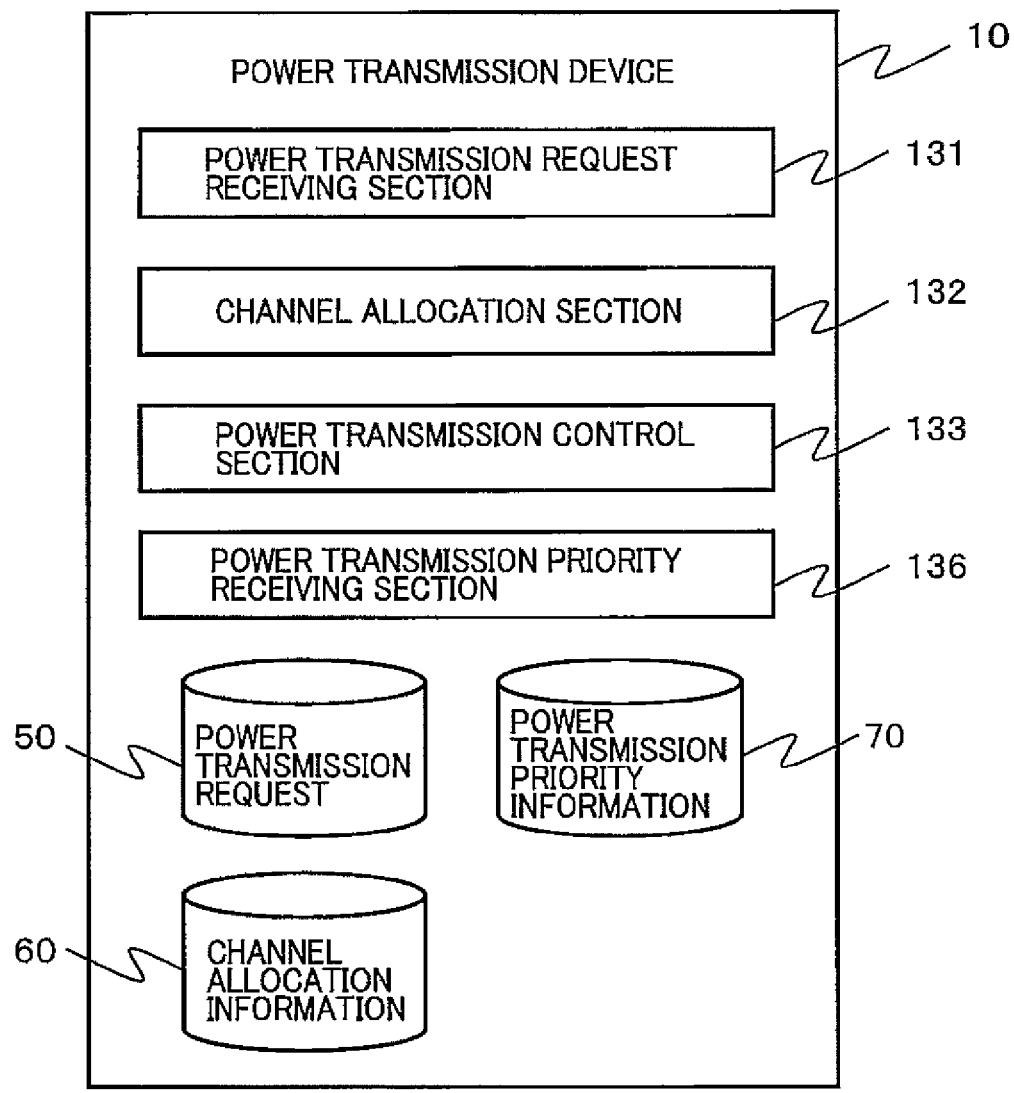
FIG. 7 describes main functions of the power transmission device 10 and information that the power transmission device 10 manages according to one or more embodiments of the invention.

FIG. 7 shows main functions of the power transmission device 10 and main information managed by the power transmission device 10 in the second example embodiment. As shown in the drawing, the power transmission device 10 includes a power transmission request receiving section 131, a channel allocation section 132, a power transmission control section 133, and a power transmission priority receiving section 136. These functions are realized by hardware of the power transmission device 10, or the central processing device 16 of the power transmission device 10 reading and executing programs stored in the storage device 17.

In the functions shown in the drawing, the power transmission request receiving section 131, the channel allocation section 132, and the power transmission control section 133 are similar to those in the first example embodiment.

The power transmission priority receiving section 136 receives, from the power receiving device 20, information (hereinafter, referred to as power transmission priority) to determine a priority in receiving wireless power transfer from the power transmission device 10.

The power transmission priority is set, for example, depending on the remaining capacity of an accumulator battery in the power receiving device 20. The power transmission priority is set, for example, so that the lower the remaining capacity of the accumulator battery of the power receiving device 20 is, the higher the power receiving device 20 obtains a priority of power transfer.

Further, the power transmission priority is set, for example, in accordance with whether or not the power receiving device 20 includes an accumulator battery. For example, the power transmission priority is set so that a higher priority is given to the power receiving device 20 that does not include the accumulator battery than that includes the accumulator battery.

Further, the power transmission priority is set, for example, in accordance with whether or not the remaining capacity of the accumulator battery is less than or equal to a predetermined value. For example, the power transmission priority is set so that a higher priority is given to the power receiving device 20 in which the remaining capacity of the accumulator battery is less than or equal to the predetermined value, regardless of whether or not the power receiving device 20 includes the accumulator battery.

As shown in FIG. 7, the power transmission device 10 manages a power transmission request 50, channel allocation information 60, and power transmission priority information 70. The power transmission request 50 and the channel allocation information 60 are similar to those in the first example embodiment.

Figure 8:
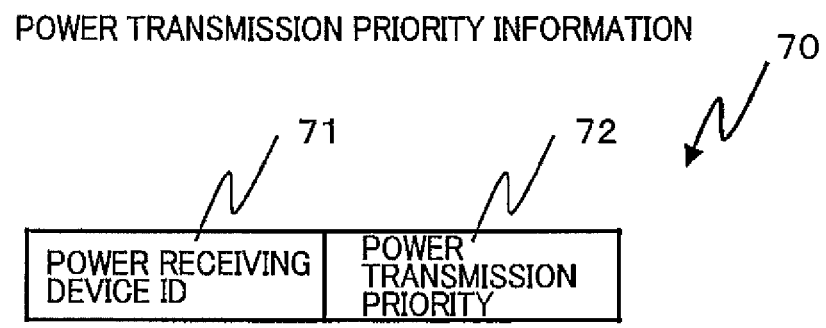
FIG. 8 describes a data configuration of power transmission priority information 70 according to one or more embodiments of the invention.

FIG. 8 shows a data configuration of the power transmission priority information 70. As shown in the drawing, the power transmission priority information 70 is configured with at least one or more records including each item of a power receiving device ID 71 and a power transmission priority 72. In these, the power receiving device ID 71 is set with the power receiving device ID described above. The power transmission priority 72 is set with a power transmission priority transmitted from the power receiving device 20 corresponding to the power receiving device ID.

Figure 9:
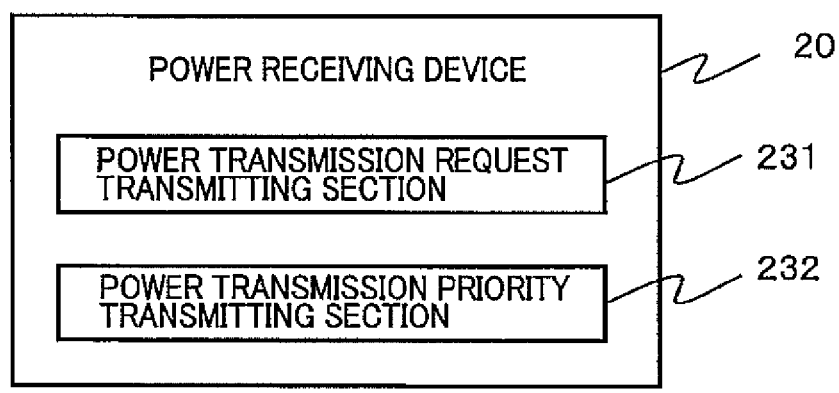
FIG. 9 describes main functions of the power receiving device 20 according to one or more embodiments of the invention.

FIG. 9 shows main functions of the power receiving device 20. As shown in the drawing, the power receiving device 20 includes a power transmission request transmitting section 231 and a power transmission priority transmitting section 232.

The power transmission request transmitting section 231 is similar to that of the power receiving device 20 in the first example embodiment, and transmits a power transmission request to the power receiving device 20. The power transmission priority transmitting section 232 transmits to the power receiving device 20 a power transmission priority set to that power receiving device 20 when the power transmission request is transmitted. These functions are realized by hardware of the power receiving device 20, or the central processing device 25 of the power receiving device 20 reading and executing programs stored in the storage device 26.

<Description of Process>

Figure 10:
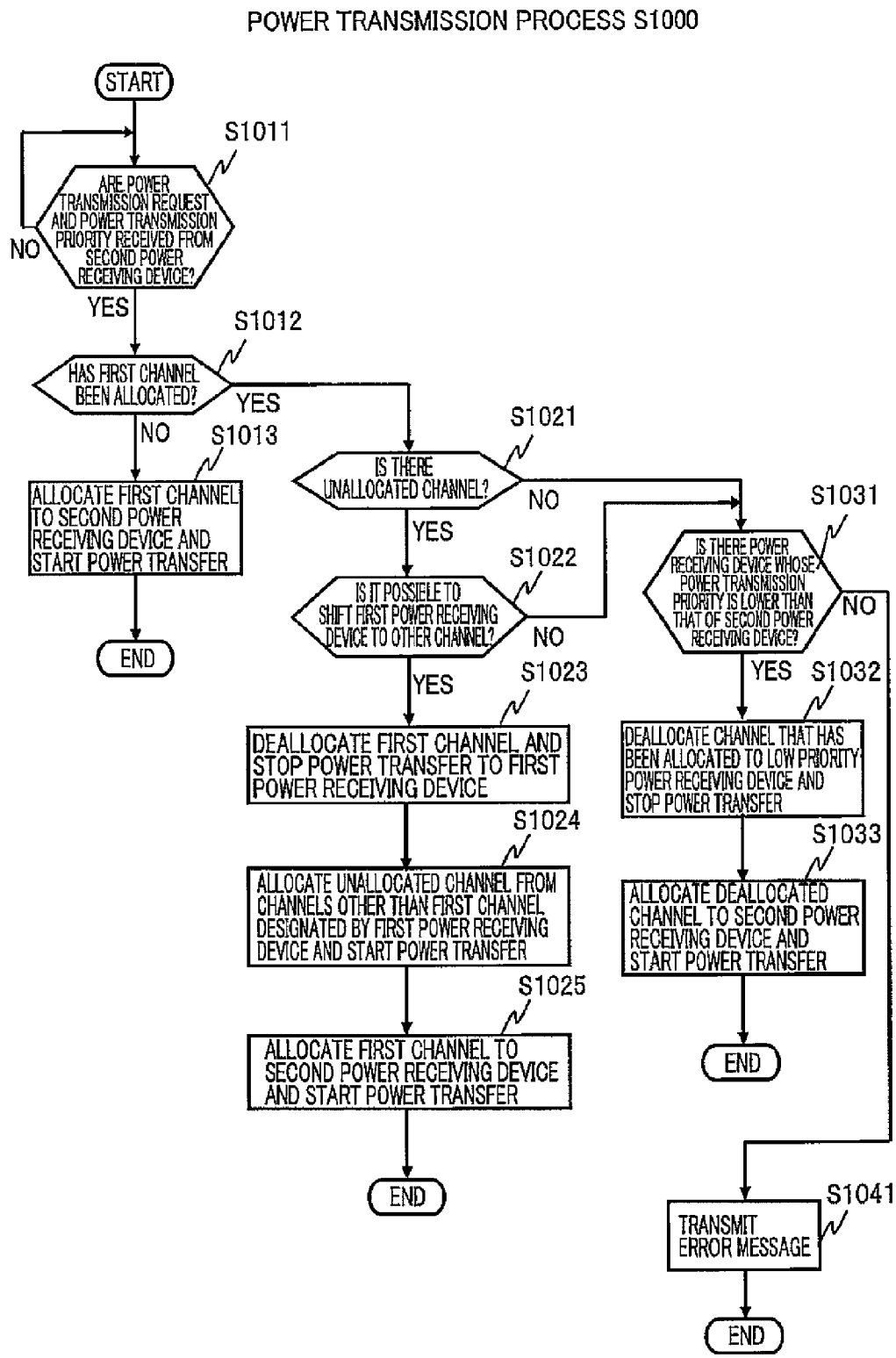
FIG. 10 is a flowchart describing a power transmission process S1000 according to one or more embodiments of the invention.

FIG. 10 is a flowchart describing a process (hereinafter, referred to as power transmission process S1000) performed by the power transmission device 10 when wireless power transfer is performed.

As shown in the drawing, the power transmission device 10 is on standby to receive the power transmission request 50 transmitted from the power receiving device 20 in real time (S1011).

When receiving the power transmission request 50 together with the power transmission priority from the power receiving device 20 (hereinafter, referred to as a second power receiving device) (S1011: YES), the power transmission device 10 refers to channel allocation information 60 to determine whether or not the channel (first channel) that is set as the channel ID 52 of the received power transmission request (hereinafter, referred to as second power transmission request) is currently allocated to another power receiving device 20 (S1012). In a case where the first channel is currently free (S1012: NO), the power transmission device 10 allocates the first channel to the power receiving device 20 as a transmission source of the received power transmission request and starts power transfer (S1013).

On the other hand, in a case where the first channel is currently allocated to another power receiving device 20 (first power receiving device 20) (S1012: YES), the power transmission device 10 refers to channel allocation information 60 to determine whether or not there is a currently unallocated channel (S1021). In a case where there is an unallocated channel (S1021: YES), the process proceeds to S1022, and in a case where there is no unallocated channel (S1022: NO), the process proceeds to S1031.

The processes S1022 to S1025 are similar to the processes S622 to S625 of the first example embodiment. In other words, the power transmission device 10 determines whether or not the channel allocated to the first power receiving device 20 can be shifted to another channel (S1022). In a case where the allocated channel can be shifted to the other channel (S1022: YES), the process proceeds to S1023, and in a case where the allocated channel cannot be shifted to the other channel (S1022: NO), the process proceeds to S1031.

In S1023, the power transmission device 10 deallocates the first channel to the first power receiving device 20 to stop the power transfer to the first power receiving device 20 (S1023), a currently unallocated channel is allocated to the first power receiving device 20 from the channels other than the first channel designated by the power transmission request 50 of the first power receiving device 20 to start power transfer (S1024), and the power transfer to the second power receiving device 20 is started using the first channel (S1025).

On the other hand, in S1031, the power transmission device 10 refers to power transmission priority information 70 to determine whether or not there is a power receiving device 20 (hereinafter, referred to as a low priority power receiving device) whose power transmission priority is lower than that of the second power receiving device 20, which is received in S1031, in the power receiving devices 20 which are in the power transmission state at present. In a case where a low priority power receiving device exists (S1031: YES), the process proceeds to S1032, and in a case where a low priority power receiving device does not exist (S1031: NO), the process proceeds to S1041.

In S1032, the power transmission device 10 deallocates the channel that has been allocated to the low priority power receiving device to stop the power transfer to the low priority power receiving device. At this time, the power transmission device 10 communicates with the low priority power receiving device to notify the low priority power receiving device of the channel that has been allocated to the low priority power receiving device. The low priority power receiving device deallocates the channel (notified from the power transmission device 10) of the power receiving circuit 24.

Further, the power transmission device 10 allocates the channel that has been allocated to the low priority power receiving device to the second power receiving device 20 to start power transfer to the second power receiving device 20 (S1033). At this time, the power transmission device 10 communicates with the second power receiving device 20 to notify the second power receiving device 20 of the channel allocated to the second power receiving device 20. The second power receiving device 20 sets the channel of the power receiving circuit 24 to the channel notified from the power transmission device 10.

In S1041, the power transmission device 10 transmits to the power receiving device 20 an error message indicating that the channel cannot be allocated.

As explained above, according to the wireless power transfer system 1 of the present embodiment, the power transmission device 10 determines whether or not there is a currently unallocated channel in a case where a power transmission request is received from the other power receiving device 20 while transmitting power to the power receiving device 20, and transmits power in accordance with the power transmission priority given to each of the power receiving devices 20 in a case where there is no unallocated channel. Thus, the wireless power transfer can be appropriately performed to the plurality of power receiving devices 20 in accordance with the power transmission priority.

Hereinabove, the embodiments of the present invention have been described. However, the above description is to facilitate understanding of the present invention and does not limit the present invention in any way. The present invention may be modified or altered without departing from the scope thereof, and of course the present invention includes its equivalents.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 wireless power transfer system
10 power transmission device
20 power receiving device
131 power transmission request receiving section
132 channel allocation section
136 power transmission priority receiving section
231 power transmission request transmitting section
232 power transmission priority transmitting section

The invention claimed is:

1. A control method of a wireless power transmission device that performs wireless power transfer, comprising:
the power transmission device
allocating one of a plurality of channels to perform wireless power transfer to a power receiving device in response to a power transmission request that is transmitted from the power receiving device and that designates one or more of the plurality of the channels having different frequencies;
while performing power transfer to a first power receiving device in response to a first power transmission request that designates a plurality of the channels and that is transmitted from the first power receiving device, with allocating a first channel that is one of the designated channels, in a case where a second power transmission request that designates the first channel is received from a second power receiving device,
stopping power transfer to the first power receiving device using the first channel;
starting power transfer to the first power receiving device using a channel other than the first channel in the plurality of the channels designated by the first power receiving device; and
starting power transfer to the second power receiving device using the first channel.

2. The control method of the wireless power transmission device according to claim 1, wherein
each of the power receiving devices is provided with a power transmission priority that is information to determine a priority in receiving the wireless power transfer from the power transmission device, and
the power transmission device
receives, from the power receiving device together with the power transmission request, the power transmission priority set to the power receiving device, and
in a case where the power transmission request is received from another power receiving device during power transmission to one or more of the power receiving devices, determines whether or not there is a currently unallocated channel, in a case where there is no unallocated channel, compares the power transmission priority received from the other power receiving device with the power transmission priorities of the power receiving devices in the power transmission state, in a case where there is a power transmission priority that is lower than that of the other power receiving device in the power transmission priorities of the power receiving devices in the power transmission state, stops power transfer to the power receiving device having the lower power transmission priority, and starts power transfer to the other power receiving device using the channel that has been allocated to the power receiving device having the lower priority.

3. The control method of the wireless power transmission device according to claim 2, wherein the power transmission priority given to the power receiving device is set in accordance with whether or not the power receiving device includes an accumulator battery.

4. The control method of the wireless power transmission device according to claim 2, wherein the power transmission priority given to the power receiving device is set depending on a remaining capacity of the accumulator battery in the receiving device.

* * * * *